United States Patent [19]

Graf et al.

[11] Patent Number: 5,246,083
[45] Date of Patent: Sep. 21, 1993

[54] INFLATABLE AIR BAG FOR MOTOR VEHICLES

[75] Inventors: Hans-Peter Graf, Gaimersheim, Fed. Rep. of Germany; Jacques M. Dulin, Morgan Hill, Calif.

[73] Assignee: Audi Ag, Fed. Rep. of Germany

[21] Appl. No.: 720,861

[22] PCT Filed: May 7, 1990

[86] PCT No.: PCT/EP90/00737
§ 371 Date: Jul. 16, 1991
§ 102(e) Date: Jul. 16, 1991

[87] PCT Pub. No.: WO91/00812
PCT Pub. Date: Jan. 24, 1991

[30] Foreign Application Priority Data

Jul. 7, 1989 [DE] Fed. Rep. of Germany ....... 3922364

[51] Int. Cl.⁵ ..................... F01N 1/16; B60R 21/32
[52] U.S. Cl. ..................... 180/271; 180/274; 280/735; 454/75
[58] Field of Search ........... 280/728, 738, 739, 740, 280/739, 735; 180/271, 274, 282, 281; 454/75, 143

[56] References Cited

U.S. PATENT DOCUMENTS

| 3,694,003 | 9/1972 | Radke | 280/150 AB |
| 3,847,411 | 11/1974 | Herrmann | 280/150 AB |

FOREIGN PATENT DOCUMENTS

| 2131479 | 1/1972 | Fed. Rep. of Germany . | |
| 3116867 | 11/1982 | Fed. Rep. of Germany . | |
| 3235176 | 3/1984 | Fed. Rep. of Germany . | |
| 3312769 | 10/1984 | Fed. Rep. of Germany . | |
| 3644554 | 4/1988 | Fed. Rep. of Germany . | |
| 55-145015 | 4/1979 | Japan . | |
| 59-206215 | 5/1983 | Japan . | |
| 0088341 | 3/1990 | Japan | 280/728 |
| 0246137 | 11/1991 | Japan | 280/728 |

*Primary Examiner*—Margaret A. Focarino
*Assistant Examiner*—Paul Dickson
*Attorney, Agent, or Firm*—Jacques M. Dulin; Thomas C. Feix

[57] ABSTRACT

Vehicle passenger collision protection device comprising an inflatable air bag and an acceleration sensor for determining the event of an impending accident and triggering the inflation of the air bag. The acceleration sensor is connected to the air bag inflation pyrotechnic propellant charge which expansion for the inflation of the air bag whereby the propellant is ignited by the appropriate sensor signal. The sensor activates a fan to run at its maximum power output to remove the combustion gases and particulates which escape from the air bag into the passenger space. The fan may be operated as a blower to force fresh air in or as an exhaust fan to suck contaminated air out of the passenger compartment. The fan is preferably the conventional fan associated with the air conditioning system provided in the vehicle. Alternately, a separate fan is connected to the existing ventilation system and may substitute for or supplement the first fan. In another alternative, the sensor controls the opening of electric windows and/or sunroof to assist the fan in rapid fresh air exchange between the outside ambient atmosphere and the passenger compartment. The fan(s), window(s) and/or sunroof can be started prior to the crash by setting the controller to activate them at a lower deceleration value than the pyrotechnic igniter. Auxiliary (battery) power supply means may be provided to insure fan operation in the event the car battery or electrical wiring is damaged in the crash.

14 Claims, 1 Drawing Sheet

INFLATABLE AIR BAG FOR MOTOR VEHICLES

FIELD

The invention relates generally to an improved collision protection device for motor vehicles of the type employing inflatable air bags. More particularly, the invention relates to an inflatable air bag collision protection device wherein a fan is provided to remove from the passenger compartment the combustion gases and fine particulates associated with the pyrotechnic propellant charge which is used to inflate the air bag. Both the fan and the triggering mechanism for the pyrotechnic propellant charge are linked to a collision sensor and are simultaneously activated upon detection of a collision by the sensor to signal the fan to begin removing the noxious smoke and combustion gases associated with the detonation of the pyrotechnic propellant charge.

BACKGROUND

Collision protection devices for use in motor vehicles of the type having an inflatable air bag which are triggered by a collision detection sensor are well known from the prior art. These air bag devices typically use a collision detection sensor unit which consists of one or more acceleration sensors which measure the acceleration or deceleration of the vehicle in order to send a triggering signal to the inflatable air bag mechanism when an accident of the appropriate severity is taking place. This triggering signal is either used directly to activate one or more pyrotechnic propellant charges to inflate the air bag or it is relayed to a switch which, in turn, ignites the propellant charge. Upon ignition, the pyrotechnic propellant charge fills the air bag within several milliseconds, thus forming an effective protective air cushion for the passenger to protect the driver from impacting his or her body and head against the steering wheel and/or dash board area of the motor vehicle.

During a front end collision, the passengers bodies are moving forward with great momentum and thus the possibility of a sudden body recoil (whiplash) is very great. Therefore, in order to catch the forward moving bodies in a soft and recoil-free manner, it is desirable to provide the air bag with one or more blow-out elements which release the propellant gas in a controlled manner as the passenger strikes the air bag so that is cushions the impact by deflating. These known blow-out elements are typically nothing more than openings in the air bags and, as a consequence, a considerable portion of the propellant gas is permitted to escape from the air bag and come into direct contact with the driver and passengers (if any) in the confines of the vehicle passenger compartment.

The combustion of these propellant gases also produces a lot of smoke (gases and particulates) which are unpleasant to smell and irritate the eyes, nose, and throats of the passengers within the vehicle. The overall air volume of the combustion gases contained in the air bag, as well as, the amount of gas that flows out of the air bag, is very large considering that the average driver side air bag has an air capacity of around 80 liters. And, if separate air bags are provided for the front and rear passengers, there may be as much as an additional 80-250 liters of combustion gases present in the passenger compartment after an accident. In addition to the unpleasant smell and the irritation of the passengers' eyes, throat and nose, breathing the combustion gases for a long period of time poses a health risk. For these reasons, it is desirable to greatly reduce the amount of combustion gases and particulates to which the passengers are exposed and must breathe. Another concern is to reduce passenger/driver anxiety and/or panic, since the smoke and smell of the scorched gaskets associated with detonated propellant charge are symptoms which can be mistaken for a vehicle fire.

These problems have become well known through the evolution pyrotechnic propellant-activated air bags, and there have been many attempts to improve the delivery system of inflatable air bags to overcome the disadvantage of unpleasant smell, poor visibility and irritation to the eyes, nose and throat associated with the exposure to the smoke and combustion gases. For example, German Patent document DE-PS 32 35 176 discloses how to arrange a container filled with aromatics within the inflatable air bag which automatically opens during the course of inflation of the air bag. The aromatic substances, when released, serve to lessen the irritation of the passengers' nose and throat from the combustion gases as they are inhaled. This method does not satisfactorily solve all the above-mentioned problems since the aromatics only adulterate the noxious combustion gases and do not overcome the problems of eye irritation and smoke production nor does it remove the noxious components from the combustion gases, it merely masks them with additional aerosols.

Another method is directed to improving the combustion gases that are released into the passenger compartment. This method is disclosed in DE-PS 36 44 554, wherein a filter is provided to a portion of a wall of an inflatable air bag adjacent the blow-out elements. The filter is designed to prevent the particulates which are released from ignition of the propellant gas from escaping through the blow-out elements of the air bag and seeping into the passenger compartment. The ability of this filter to filter out fine particles (elements) is compromised since the filter must have a relatively large mesh in order to allow the combustion gas to flow rapidly out of the inflating air bag to permit a sufficiently soft (recoil free) deflation-type cushioning surface for the passenger. However, effective removal of all the harmful gases requires that the filter be very tight or thick (i.e., a very fine mesh), but a thick filter hinders the outflow process, and thus impairs the necessary recoil (anti-whiplash) operation of the air bag. In reality, only relatively large particles are prevented from escaping through the air bag filter of this type and these large particles constitute only a minor portion of the total combustion gases. Thus, a major portion of the aforementioned noxious fumes and smoke particulates are still permitted to escape into the passenger compartment when using this method and the health problems and poor visibility conditions still exist.

It is also known from the prior art to provide a device which measures and monitors the oxygen content in the passenger compartment. An example of such a known device is disclosed in JP 59-206215 A, wherein it is disclosed to provide an oxygen sensor to measure the oxygen concentration in the passenger compartment and which also is used to send an alarm signal to activate a fan for ventilation of the passenger compartment when a specified limit value is exceeded. A similar device is disclosed in JP 55-145015 A, wherein the sensor automatically opens or shuts the windows of the passenger compartment depending on the concentration of tobacco smoke which is detected by the sensor. These types of devices call for the use of gas sensors which are expensive and are otherwise undesirable for use in conjunction with air bag devices since they typically have rather long response times and therefore are not well-suited to solve the above mentioned problems associated the combustion gases.

Another problem associated with inflatable air bags is the sudden increase in air pressure experienced within the passenger compartment caused by the sudden passenger compartment volume decrease upon rapid inflation of the air bag. This sudden pressure increase is unpleasant, and in extreme cases, can result in injury to the passenger(s), e.g. rupture of the eardrum(s). Both DE-OS 33 12 769 and DE-AS 21 31 479 disclose a common method for remedying this situation wherein a portion of the window pane of the vehicle is shattered simultaneously with the activation of the pyrotechnic charge so that the resulting pressure wave within the passenger compartment can escape to the outside ambient atmosphere. Since the purpose of creating an opening in the window pane is to equalize the internal passenger compartment pressure with the outside ambient atmosphere, the opening is not required to be very large. Therefore, after pressure equalization has occurred, there is virtually no more exchange of air through the shattered region of the window. Thus, the health and visibility problems and irritation to the passengers' mucous membranes caused by the combustion gases and smoke still exist since the gas escaping from the air bag does not flow fast enough through the shattered region of the window to clear the passenger compartment.

Another problem with motor vehicles equipped with air bag collision protection devices arise in the situation where the driver and/or passengers must exit or be removed from the vehicle quickly due to the potential danger of a vehicle explosion or fire which is made difficult due to the presence of the inflated air bag and the blinding smoke within the passenger compartment. DE-OS 31 16 867 provides a switching circuit which activates the emergency functions in the automobile wherein the collision sensor for use in activation of the inflatable air bag is also used for the simultaneous activation of emergency functions, such as: 1) shutting off the fuel pump; 2) opening a central locking device; and 3) turning on a warning signal flasher system. While such a switching circuit reduces the possibility of a vehicle fire and enables the passengers to see and operate the door mechanisms in order to exit the vehicle more quickly (or be helped by rescue personnel) in order to escape the noxious fumes and smoke of the combustion gases, this switching circuit does not alleviate the above mentioned problems in the situation where no rescue personnel are present and where the passengers are unable to quickly exit the passenger compartment, (i.e., they are unconscious or the doors are damaged and won't open).

Accordingly, there is a great need in the art for a simple and cost effective implementation of an air bag detection device for motor vehicles wherein the noxious combustion gases and fine smoke particulates associated with the detonated pyrotechnic propellant charge are quickly removed from the passenger compartment upon inflation of the air bag.

THE INVENTION
OBJECTS

It is among the objects of the present invention to provide an air bag inflation system which removes, from the passenger compartment, the noxious fumes, smoke, particulates and other harmful components of the combustion gases associated with the detonated pyrotechnic propellant charge used to inflate the air bag so that exposure to these combustion gases and smoke particulates by the driver and/or passengers is kept to a minimum;

It is another object of the invention to provide a fan for use in combination with a collision sensor of the air bag system whereby the fan is activated simultaneously with the triggering of the pyrotechnic propellant charge of the inflatable air bag so that the resulting combustion gases are quickly removed from the passenger compartment;

Still other objects will be evident from the specification drawings and claims that follow.

DRAWINGS

The invention is illustrated in more detail by reference to the drawings in which:

FIG. 1 is a schematic diagram of the forward half of a motor vehicle showing the collision protection device of the invention; and FIG. 2 shows a schematic diagram of an alternate embodiment for the collision protection device of this invention.

SUMMARY

Pursuant to the invention, an improved collision protection device for automobiles using inflatable air bags of the type employing a pyrotechnic propellant charge to inflate the air bag is provided with a fan which is activated to remove, from the passenger compartment, the combustion gases and particulates associated with the detonated propellant charge. The invention comprises an acceleration sensor for signalling an airbag control device which is disposed in the front portion of the automobile and which, in turn, is connected via control wires to both the pyrotechnic propellant charge of the uninflated air bag and the fan. The air bag and pyrotechnic propellant charge are contained within a baffle portion or impact plate of the steering wheel of the vehicle. One or more air bags and/or fans may be provided at preselected positions throughout the vehicle to provide for collision protection for the front-seated passenger(s) as well as passengers seated in the backseat(s).

In operation, the acceleration sensor detects sudden decelerations which indicate an impending collision of an appropriate severity, and activates the pyrotechnic propellant charge associated with the stored air bag. The acceleration sensor simultaneously signals the fan to operate at its maximum output in order to begin the removal of combustion gases which escape from the blow-out elements of the inflating air bag as the forward moving passenger compresses the air bag. Thus, all the harmful effects associated with the combustion gases and particulates, including poor visibility and unpleasantness due to smoke and gas irritation of the passengers' eyes, ears, and nose, as well as other health hazards associated with breathing the combustion gases and particulates is prevented. Reference to "smoke"

herein includes all gases and particulates associated with the pyrotechnic combustion gases of the inflation device.

In a preferred embodiment, the fan is part of the existing air conditioning system or ventilation system (in the case where there is no air conditioning system) of the automobile so that no undue modification or extra accessories are required to implement this invention.

It has been found that conventional fans, when operated at their maximum output, provide the necessary air exchange capability to quickly remove a substantial portion of the combustion gases associated with the detonated pyrotechnic propellant charge of the air bag.

In a first alternate embodiment, a separate fan, distinct from the normal air conditioning system, is provided to either force fresh air into and/or exhaust the combustion gas filled-air out from the passenger compartment. This second fan is also activated simultaneously with or before the activation of the pyrotechnic propellant charge. In the case of the second fan being disposed adjacent the normal vent openings of the air conditioning system, the fan is preferably operated in a suction mode in order to exhaust the combustion gases from the passenger compartment.

In a second alternate embodiment, the sensor includes a switch unit which, in addition to the airbag and fan, electrically controls the electric motors to open the sunroof (if provided) and the windows, to assist the fan in removing the smoke and combustion gases from the passenger compartment.

In both the preferred and alternate embodiments, the operation of one or more fans in the suction or exhaust mode also assists in equalizing the sudden air pressure increase in the passenger compartment associated with the pressure wave created by the exploding propellant-/inflation charge.

Further, starting the fan early creates a negative pressure in the passenger compartment so the airbag is deployed more rapidly and/or the propellant/inflation charge can be reduced. Starting early means starting the fan before the propellant/inflation charge is ignited. For example, the fan can be set to start at a lower deceleration level that must be reached to initiate propellant discharge. This can be characterized as a near-crash condition. Thus the fan can be started and/or boosted to high upon sensing a near crash, and this can be done without disadvantage even if no crash occurs, e.g. a panic or emergency stop without a crash deceleration. The fan starts or boosts to high early to produce the negative pressure without any effect on the driver or passenger, but with the advantages described above.

For ease of production and cost effectiveness it is desirable to incorporate the fans of the preexisting air conditioning system with the acceleration (deceleration) sensor and pyrotechnic propellant/inflation charge triggering device so that little modification is necessary to the existing air bag system collision protection systems.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Figure 1:
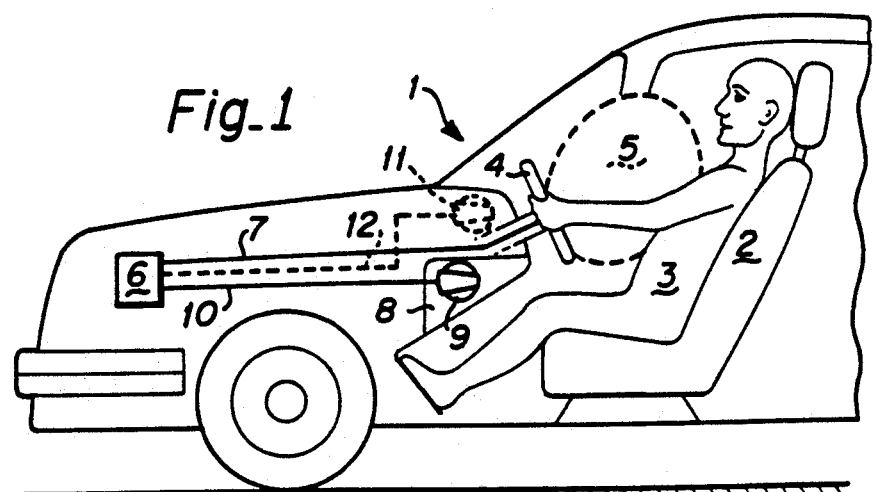

FIG. 1 shows schematically the front part of the motor vehicle 1 in which a passenger 3 is sitting on a seat 2. The steering wheel 4 is provided with a baffle or impact plate portion which contains a sufficiently large enclosure volume to store an uninflated air bag along with the pyrotechnic propellant charge. The dashed lines represent the air bag 5 in the operational (inflated) condition after the propellant charge has been ignited and the air bag 5 has been inflated in front of the passenger 3. Detonation of the propellant charge is accomplished by means of a triggering signal generated from an acceleration sensor 6 which includes a switching device and is disposed in the front portion of the vehicle. A control wire 7 transfers the appropriate activation signal from the acceleration sensor to the steering wheel 4.

As is best seen in the FIG. 1, fan 9 is disposed adjacent the dashboard area of the passenger compartment. The fan 9 is linked to the acceleration sensor 6 by a control wire 10. In the preferred best mode, the fan 9 is the same fan used in the air conditioning system 8 already provided to the vehicle 1. In operation, the acceleration sensor 6 detects a rapid deceleration associated with an impending collision of the appropriate severity and sends a triggering signal to the pyrotechnic propellant charge (not shown) contained within the steering wheel 4 which ignites and causes the air bag 5 to inflate. At the same time the fan 9 is turned on and continuously operates in order to remove, from the passenger compartment, the combustion gases which escape from the conventional blow-out elements (not shown) of the air bag into the passenger space.

In the preferred best mode of the invention, the fan 9 is used as a blower and is set to its maximum power output at the time the propellant charge is ignited in order to quickly exhaust or force out the unpleasant and noxious combustion gases from the passenger compartment via the ventilation system without any appreciable delay relative to the event of the pyrotechnic charge ignition.

In an alternate embodiment, a separate fan 11 may be provided (shown in phantom) to either replace or assist the first fan 9 in removing the combustion gases from the passenger compartment. As is shown in FIG. 1, the separate fan 11 also communicates with the acceleration sensor 6 via a control wire 12. Fan 11 is preferably provided in the dash board area of the passenger compartment and is adapted to permit the exchange of air between the passenger compartment and the outside ambient atmosphere. The fan may preferably be operated in a suction mode so that the combustion gases are exhausted from the passenger compartment through the ventilation system of the automobile via fan 11. In the alternative, the fan 11 may also be operated as a blower to force additional fresh air into the passenger compartment in order to expel the combustion gases through the normally present ventilation outlets of the passenger compartment.

Figure 2:
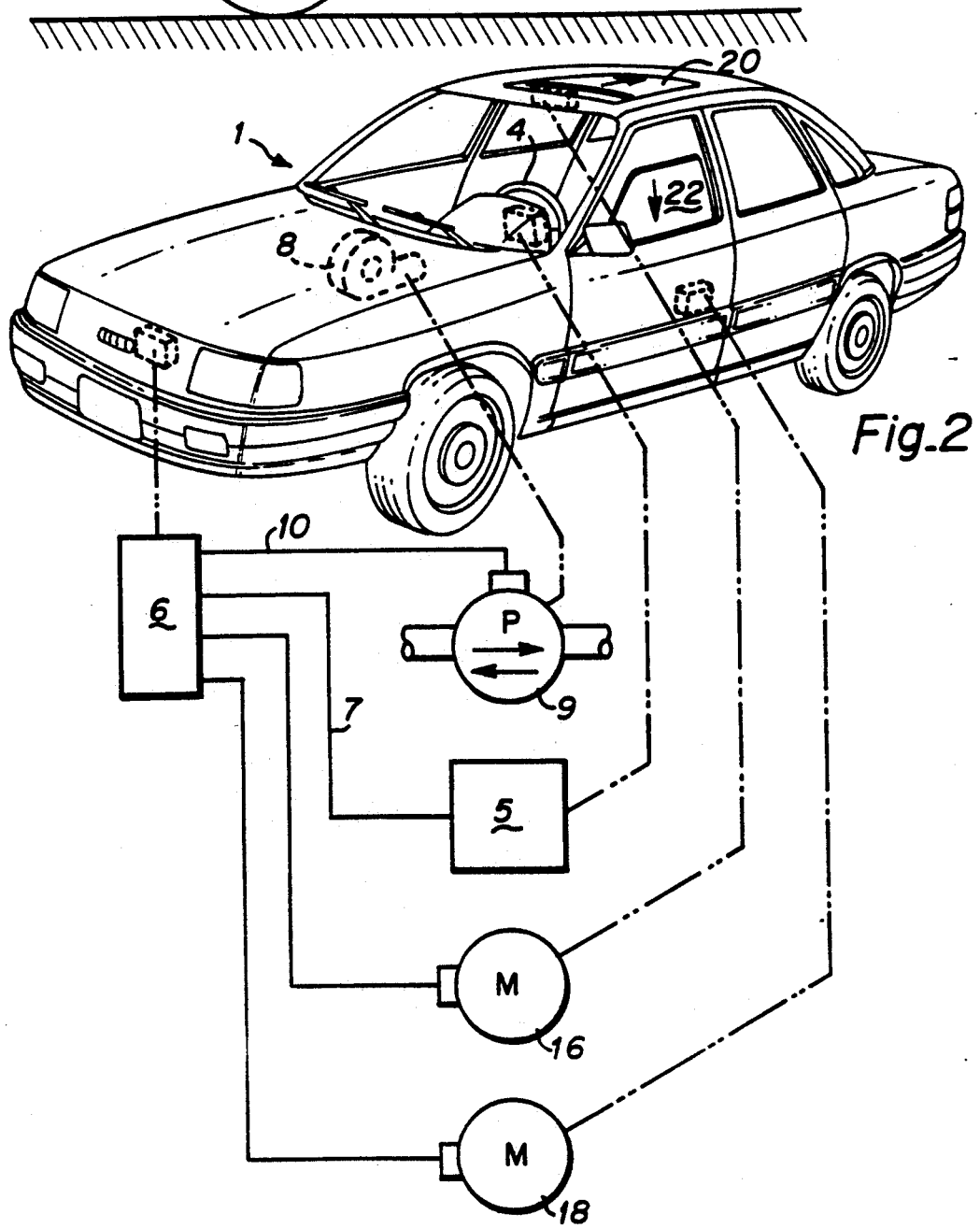

FIG. 2 shows a second alternate embodiment of the collision protection control device of the invention. As before, the acceleration sensor 6 electrically controls the fan 9 (symbolized as a reversible pump) and the triggering mechanism for the airbag 5 via control wires 10 and 7. The acceleration sensor 6 also includes a switching unit (not shown) which permits the electrical control of the electric motor drives 16, 18 for both the sunroof 20 and one or more windows 22, respectively. As is seen in FIG. 2, the electric/electronic control circuitry is also shown by the dash-dot lines as connected to the respective devices within the car body. According to this embodiment, the windows and/or sunroof are opened simultaneously with the detection of a collision by sensor 6. This permits fresh air to flush into the passenger compartment and assist the fan 9 in removing the smoke and combustion gasses generated by inflation of the airbag 5.

The opening of the windows and/or sunroof may be timed to at least start to open in advance of the anticipated airbag inflation, to serve in reducing the sudden passenger compartment pressure increase associated with the pressure wave created by propellant charge detonation and airbag inflation.

While it is shown in both FIGS. 1 and 2 that the fans are disposed in the forward areas of the passenger compartment, it is understood that one or both fans 9 and 11 may be positioned in any number of locations within the passenger compartment so that they may be easily implemented in combination with currently available dual-fan, series-circuited air conditioning systems.

From a production standpoint it is cost effective to utilize the existing fan(s) associated with the air conditioning system of the automobile as the blower and/or vacuum fan(s) for removing the combustion gases from the passenger compartment. Also, as noted above, it is preferable to set or boost the fan(s) to a maximum power output level in order to rapidly remove combustion gases from the passenger compartment. The fan(s) can be set to operate at a maximum power without major modifications to the existing air conditioning system, thereby avoiding the necessity for costly retrofit accessories since existing fans are already capable of creating a rapid air exchange sufficient to completely clear the passenger compartment of combustion gases and smoke in a short period of time.

It should be understood that various modifications within the scope of this invention can be made by one of ordinary skill in the art without departing from the spirit thereof. For example, the electric circuit connecting the acceleration sensor 6 and fan 9 (and fan 11 in the case of dual-fans) may also include means for signalling the windows and/or sunroof of the vehicle to open to further assist in pressure equalization and in the rapid removal of the combustion gases and smoke from the passenger compartment. Additionally, a small, one-use gel cell, continuously trickled-charged from the battery/alternator system of the car, can be disposed closely associated with the fan(s) 9 and/or 11 to power the fan(s) and/or window(s)/sunroof to operate them in the event the crash destroys the main car battery or severs the electrical connection between the car battery and fan and window(s) and/or sunroof. I therefore wish my invention to be defined by the scope of the appended claims in view of the specification as broadly as the prior art will permit.

I claim:

1. An improved air bag restraint system for use in motor vehicles of the type in which a sensor detects the impending occurrence of an accident and signals a control unit to ignite a pyrotechnic propellant charge associated with an air bag to permit combustion gas inflation of said air bag to provide a protective, recoil-free cushion for the forward moving passenger(s), wherein the improvement comprises:

a) means for continuously removing from the passenger compartment the combustion gases and smoke particulates that escape from said air bag during air bag actuation and for continuing to remove combustion gases and smoke particulates after said air bag actuation such that the amount of said combustion gases and smoke particulates inhaled by said passenger(s) is substantially reduced; and
   b) said combustion gas and smoke removal means is connected to said sensor and is activated for operation substantially simultaneously with the ignition of said pyrotechnic propellant charge.

2. An improved air bag restraint system as in claim 1 wherein:
   a) said combustion gas and smoke removal means is a fan; and
   b) said fan is disposed within an air passageway of said motor vehicle between said passenger compartment and the outside ambient atmosphere.

3. An improved air bag restraint system as in claim 2 wherein said fan commences to operate at a maximum power output when an impending accident is detected by said sensor.

4. An improved air bag restraint system as in claim 3 wherein said fan operates in a suction mode to exhaust said combustion gases and smoke from said passenger compartment and to permit pressure equalization between said passenger compartment and said outside ambient atmosphere to that the tendency for overpressure-related injury to said passenger(s) caused by a pressure wave associated with said ignited propellant charge is reduced.

5. An improved air bag restraint system as in claim 3 which includes:
   a) means for triggering the opening operation of at least one electrically-operated passenger compartment aperture of said motor vehicle; and
   b) said triggering means for said passenger compartment aperture is connected to said sensor and disposed to operate upon sensing of an impending accident.

6. An improved air bag restraint system as in claim 3 wherein:
   a) said fan is a separate fan dedicated to removing said combustion gases and smoke from said passenger compartment during an accident.

7. An improved air bag restraint system as in claim 3 wherein:
   a) said fan is a fan ordinarily provided for the ventilation or air conditioning system of said motor vehicle.

8. An improved air bag restraint system as in claim 3 which includes:
   a) means for triggering operation of at least one of said fan and an opening of a passenger compartment aperture in response to a sensed deceleration value less than that required to trigger detonation of said air bag propellant charge so that compensation for a pressure wave is initiated prior to air bag deployment.

9. An improved air bag restraint system as in claim 8 which includes:
   a) a separate battery means associated with at least one of said fan and said passenger compartment aperture and electrically connected therewith for providing operating power in the event of crash induced ordinary battery power loss.

10. An improved air bag restraint system as in claim 5 wherein:
 a) said fan is a fan ordinarily provided for the ventilation or air conditioning system of said motor vehicle.

11. An improved air bag restraint system as in claim 4 wherein:
 a) said fan is a separate fan dedicated to removing said combustion gases and smoke from said passenger compartment during an accident.

12. An improved air bag restraint system as in claim 4 wherein:
 a) said fan is a fan ordinarily provided for the ventilation, or air conditioning system of said motor vehicle.

13. An improved air bag restraint system as in claim 4 which includes:
 a) means for triggering operation of at least one of said fan and an opening of a passenger compartment aperture in response to a sensed deceleration value less than that required to trigger detonation of said air bag propellant charge so that compensation for said pressure wave is initiated prior to air bag deployment.

14. An improved air bag restraint system as in claim 4 which includes:
 a) a separate battery means associated with at least one of said fan and a passenger compartment aperture and electrically connected therewith for providing operating power in the event of crash induced ordinary battery power loss.

* * * * *